United States Patent [19]

Fuss et al.

[11] Patent Number: 5,347,374
[45] Date of Patent: Sep. 13, 1994

[54] CASCADED IMAGE PROCESSING USING HISTOGRAM PREDICTION

[75] Inventors: William A. Fuss, Rochester; Reiner Eschbach, Webster, both of N.Y.

[73] Assignee: Xerox Corporation, Stamford, Conn.

[21] Appl. No.: 147,614

[22] Filed: Nov. 5, 1993

[51] Int. Cl.$^5$ ............................................. H04N 1/46
[52] U.S. Cl. ..................................... 358/522; 358/520; 382/18
[58] Field of Search ............... 358/500, 501, 515, 518, 358/520, 522, 296; 382/296, 18, 51; 348/672, 603, 655, 673; 355/326, 327; 346/157; H04N 1/46

[56] References Cited

U.S. PATENT DOCUMENTS

| | | | |
|---|---|---|---|
| 4,667,228 | 5/1987 | Kawamura et al. | 348/672 |
| 4,731,671 | 3/1988 | Alkofer | 358/522 |
| 5,177,602 | 1/1993 | Fujimori | 358/522 |
| 5,278,921 | 1/1994 | Nakamura et al. | 382/18 |
| 5,305,119 | 4/1994 | Rolleston et al. | 358/522 |

OTHER PUBLICATIONS

"Xerox Color Encoding Standard" XNSS 289005, 1989.

*Primary Examiner*—Richard Hjerpe
*Assistant Examiner*—Kim Yen Vu
*Attorney, Agent, or Firm*—Mark Costello

[57] ABSTRACT

A method of improving processing of a color natural scene image defined by color density signals processed by multiple processing elements, wherein after an exposure processor incorporates a luminance signal histogram, a modifying TRC curve is derived and applied to the luminance histogram signal. The resultant modified luminance histogram signal is blurred prior to directing it to a contrast processor. The modifying TRC curves determined at each processor are combined and applied to the color density signals only after combination.

12 Claims, 5 Drawing Sheets

CASCADED IMAGE PROCESSING USING HISTOGRAM PREDICTION

The present invention is directed toward a method and apparatus for improving the appearance of a digital image having a pictorial scene, and more particularly, toward improving processing time and image quality of an image which is processed by multiple cascaded processing elements.

CROSS REFERENCE

Cross reference is made to the following co-pending applications: U.S. Ser. No. 08/131,172, filed Oct. 4, 1992, entitled "Image-Dependent Color Shifting of Strongly Color Shifted Images", by R. Eschbach (assigned to the same assignee as the present application); U.S. Ser. No. 08/132,973, filed Oct. 7, 1993, entitled "Image-Dependent Exposure Enhancement", by R. Eschbach, (assigned to the same assignee as the present application); U.S. Ser. No. 08/133,231, filed Oct. 7, 1993, entitled "Image-Dependent Luminance Enhancement", by R. Eschbach et al, (assigned to the same assignee as the present application); U.S. Ser. No. 08/139,660, filed Oct. 22, 1993, entitled "Image Dependent Color Correction Using Black Point and White Point in a Natural Scene Pictorial Image", by R. Eschbach (assigned to the same assignee as the present application); and U.S. Ser. No. 08/147,612, filed Nov. 5, 1993, entitled "Image-Dependent Sharpness Enhancement", by R. Eschbach et al., (assigned to the same assignee as the present application).

BACKGROUND OF THE INVENTION

In the past, a typical application for copiers or scan-to-print image processing systems was to reproduce an input image as accurately as possible, i.e., render a copy. Thus, copies have been rendered as accurately as possible, flaws and all. However, as customers become more knowledgeable in their document reproduction requirements, they recognize that an exact copy is often not what they want. Instead, they would rather obtain the best possible document output. Until recently, image quality from the output of a copier or a scan-to-print system was directly related to the input document quality. One very common set of input documents includes photographs. Unfortunately, photography is an inexact science, particularly among amateurs, and original photographs are often poor. Alternately, technology, age or image degradation variations often result in pictures having an unsatisfactory and undesirable appearance. What is desired then, is a copy giving the best possible picture, and not necessarily a copy of the original.

Photography has long dealt with this issue. Analog filters and illumination variations can improve the appearance of pictures in the analog photographic process. Thus, for example, yellow filters enhance the appearance of white clouds against a blue sky in black and white images. Further, various electrophotographic devices, including digital copiers, can clean up and improve images by adjustment of threshold, filtering, or background suppression. Generally, these methods are manual methods which a user must select on an image by image basis. Unfortunately, the casual user is not skilled enough to perform these operations. The inability to perform image enhancement operations is exacerbated when additionally dealing with color controls.

Three possible choices are presented by the art in the area of image enhancement. In the first case, we can do nothing. Such a system is a stable system, in that it does no harm to an image. This is a common approach taken to reproduction. However, the output documents of such a system are sometimes not satisfactory to the ultimate customer.

In a second case of image enhancement, the image can always be processed. It turns out that an improvement can usually be made to an image if certain assumptions are made that are accurate for most cases. In an exceptionally large set of images, increasing contrast, sharpness, and/or color saturation, will improve the image. This model tends to produce better images, but the process is unstable, in that for multi-generation copying, increases in contrast, saturation, or sharpness are undesirable and ultimately lead to a severe image degradation. Further the process may undesirably operate on those images which are good ones.

Accordingly, we arrive at our third case of image enhancement, a process of automated image enhancement which operates to vary images which are not perceived as good images, but does not operate on images which do not need to be improved.

Many improvements can be made to an image, including exposure adjustment (described in previously filed U.S. patent application Ser. No. 08/132,973, filed Oct. 7, 1993), color balance correction (described in previously filed U.S. patent application Ser. No. 08/131,172, filed Oct. 4, 1993, and U.S. patent application Ser. No. 08/139,660, filed Oct. 22, 1993) or contrast enhancement (described in previously filed U.S. patent application Ser. No. 08/133,231, filed Oct. 7, 1993) Generally, these processing methods operate by modifying a set of reproduction curves (TRCs). The output image is achieved by using TRC curves, operating either on the luminance channel of an image expressed $LC_1C_2$ coordinates, or preferably on each channel in a color density space description of the image in Red-Green-Blue (rgb) coordinates. One possible cascade or serial order for such processing is: 1) exposure correction, 2) contrast correction, and 3) color correction. One possible way of implementing such an arrangement is for each processor to determine the required correction, operate on the TRC curve, generate a new corrected image and use the histogram of the corrected image for the next processor.

A problem in cascading several operations that work on the image data is that subsequent processing modules have to receive the information of the operations of the prior modules in order to perform the correct modifications based on the image at that particular stage of proceeding. Accurate processing requires the prediction of the image resulting from prior processing, particularly where the TRC correction is calculated for the luminance channel, but applied to each rgb separation (a preferred mode). In cases where the processing is determined as a function of the image histogram, it is sufficient to predict the histogram of the image at every step of the processing. While in a black and white image, the modification of the histogram is deterministic and the altered histogram can be easily calculated; in color systems the use of the altered TRC curve of the three component color image leads to a modification of the histogram that cannot be calculated. The use of the calculated luminance histogram ignoring the color nature of the image would result in a poor approximation of the actual histogram. The effect of measuring in luminance terms and applying the TRC curve in RGB can be understood using an example of two pixels having the same luminance, but representing different colors (Xerox red, green, blue as described in the "Xerox Color Encoding Standard," XNSS 289005, 1989) in an 8 bit system:

Point1(r,g,b)=(10,30,50)→luminance=26.2(given by 0.253×10+0.684×30+0.063×50)

Point2(r,g,b)=(30,10,187)→luminance=26.2(given by 0.253×30+0.684×10+0.063×187)

Given a TRC that has a piecewise linear mapping of:

0≦input<20 in←3.0×in

20≦input<40 in←1.5×in

40≦input<255 in←1.0×in results in new pixel values:

Point1(r,g,b)=(30,45,50)→luminance=41.5(given by 0.253×30+0.684×45+0.063×50)

Point2(r,g,b)=(45,30, 187)→luminance=43.7(given by 0.253×45+0.684×30+0.063×187)

This example illustrates that pixels originally having identical luminance signals can have different luminance signals after processing the rgb separations. In order to get the actual luminance histogram at this point, a luminance signal would have to be re-derived or re-measured, by processing all data. As this process requires significant processing time for generation of the required histograms and TRC corrections, it is less than desirable. Implementations in software of the re-derived or re-measured histogram method would be particularly undesirable.

The reference cited, and specifically the several image processing applications owned by the assignee of the present application, are incorporated by reference herein.

SUMMARY OF THE INVENTION

In accordance with the invention, there is provided a method of improving processing time of a color natural scene image, processed by multiple processing elements, and improving image quality of a color natural scene image.

In accordance with one aspect of the invention, there is provided a method of improving processing time of a color natural scene image defined by color density signals processed by multiple processing elements, wherein after an exposure processor incorporates a luminance signal histogram, a modifying TRC curve is derived and applied to the luminance histogram signal. The resultant modified luminance histogram signal is blurred prior to directing it to a contrast processor. The modifying TRC curves determined at each processor are combined and applied to the color density signals only after combination.

The inventive method is used to allow the generation of intermediate image signals for processing by a cascaded string of processing elements. Estimating an intermediate histogram allows the elimination of the slow re-measuring step, and consolidation of different TRC's into a single TRC, with the advantages that higher precision values can be used (e.g. 10 bit rather than 8 bit) and only a single table look-up step will be required to perform the desired operation instead of n (where n=number of processors) table look-ups. This method also enables an improved image quality by reducing the quantization errors inherent in multiple 8 bit table look-ups.

These and other aspects of the invention will become apparent from the following descriptions used to illustrate the preferred embodiment of the invention, read in conjunction with the accompanying drawings in which.

DETAILED DESCRIPTION OF THE INVENTION

Figure 1:
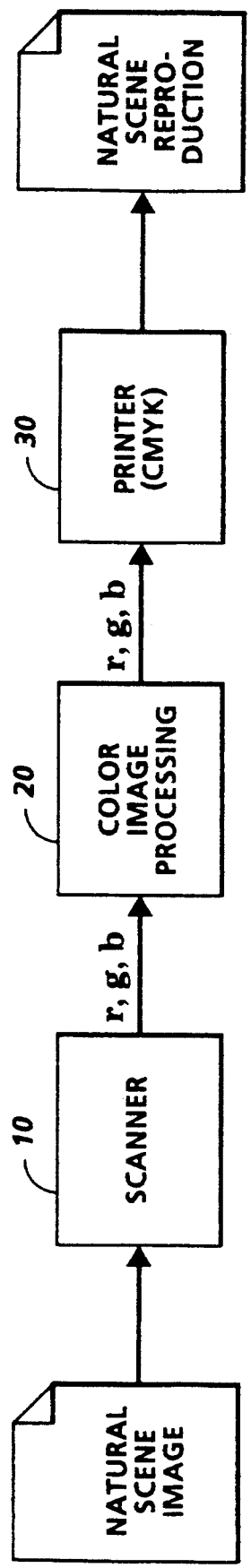
FIG. 1 shows a block diagram of a system employing the present invention.

Referring now to the drawings where the showings are for the purpose of describing the embodiment of the invention and not for limiting same, reference is made to FIG. 1 scan-to-print system in which the present invention may find advantageous use.

FIG. 1 illustrates a scanner 10 which may conveniently be a black and white or color scanner which produces image signals defined in either RGB space for color images or density space for black and white images. These images of concern are pictorial in nature, i.e., they represent natural scenes. While certain computer generated imagery may qualify as representing nature scenes, the contemplated images are predominantly scanned photographs. The images themselves are defined in terms of pixels, wherein each pixel has a gray value which varies between a white level and a black level. In a currently desirable system, in which calculations may be done on 8 bits of information, 256 levels of gray will be available for use. Pixels are also identified in terms of position, i.e, a pixel defines a unique area within the image, identified by its position in a scan line, and the scan line position in a page. Color is therefore represented by triplets of gray pixels for each color pixel in the image, each triplet of gray pixel defining the color in each separation, which together form the color pixel.

The output of a scanner 10 may be directed to an automated image enhancement system which will be further defined herein. For our purposes, the automated image enhancement system may include a segmentation system which can identify within a document a type of image, including pictorial and non-pictorial image areas. It will be assumed that the output of the automated image enhancement system that is described herein will be directed to a printer, CRT, or like device. These devices may have many characteristics and may be laser printers, or ink jet printers or LED displays or CRT displays. However, they have as a common requirement the representation of gray pictorial images. This may be done with gray printing or pseudo gray printing.

In terms of deriving data for operation by the present image enhancement system, a prescan may be performed on a document placed on a copying platen and scanned by the electro-optical system of the scanner to produce a signal representing the document image. Alternatively, the image may be directed to the automated image enhancement system from a memory, having previously been scanned or derived some other system, in which case, the received image is sampled as required. The prescan is undersampled, i.e., the image need not be sampled at the ultimate resolution of the system for the purposes of enhancement. In practice, it has been determined that a relatively small number of pixels representative of and dispersed through the entire image can accurately represent the image for this purpose. In one particular embodiment, we use a block of pixels derived from the image, in approximately 512 pixels×512 pixels. The primary purpose of this selection is to improve the speed at which a software image enhancement system can process the pictorial images. Sampling at common image resolutions does not improve the results noted in the inventive process herein described significantly, and dramatically increases the software processing time required. Hardware embodiments of the described inventive process might decide not to undersample the image.

The input image color signals are edited, enhanced add prepared for printing at color image processing unit 20, which in FIG. 1 provides as an output r, g, b signals. Printer 30 receives the signal from color image processing unit 20, and provides for conversion of the signals to printer driver signals, commonly given in terms of the colorants that will be used in reproduction, typically Cyan, Magenta, Yellow and Key or black (CMYK). The printer has an output of the natural scene image, which, hopefully, matches user expectations of a "good" output image. Alternatively, the processed image from color image processing unit 20 is displayed on a television screen, CRT display or the like.

Figure 2:
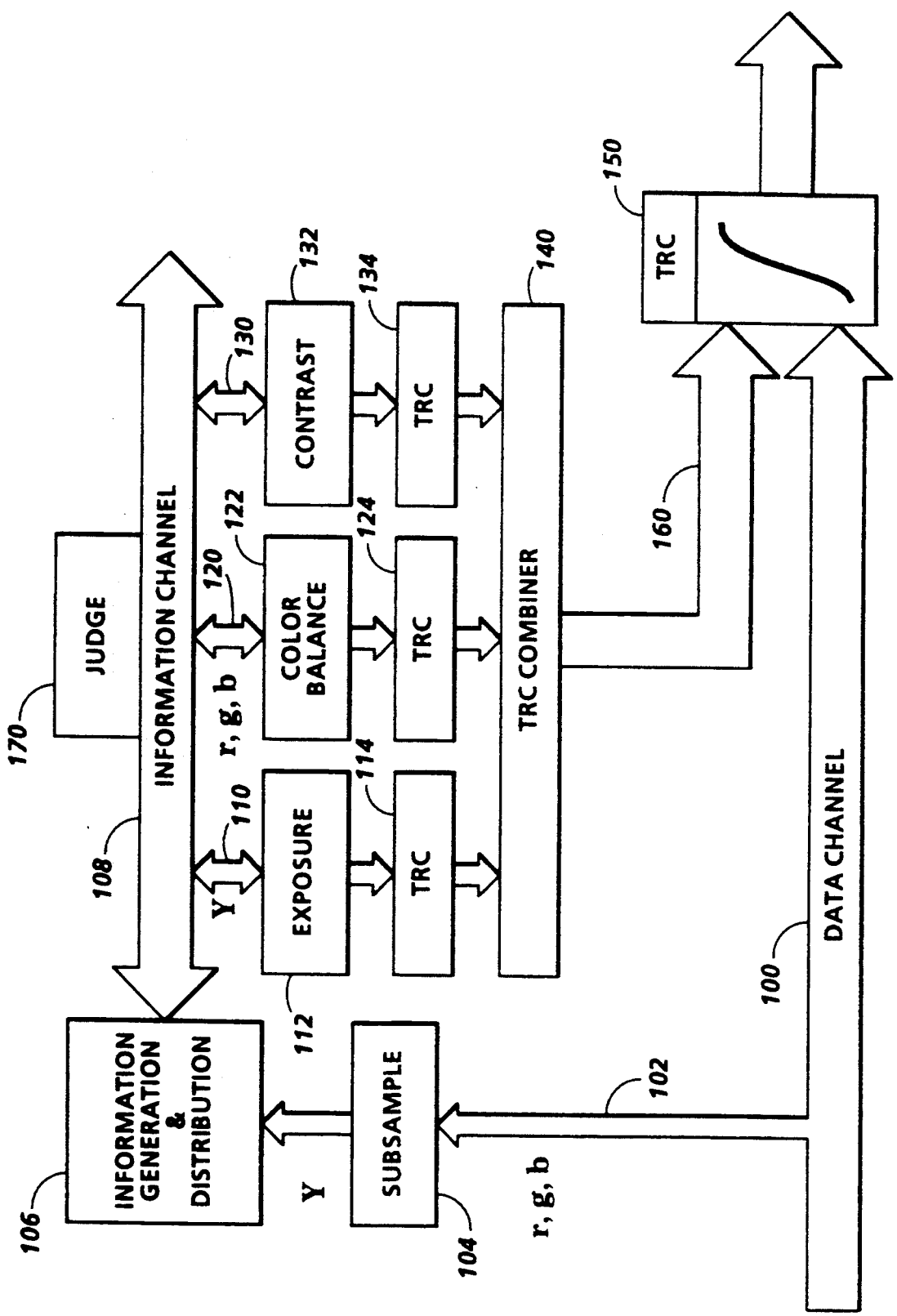
FIG. 2 shows a block diagram of the processing system described.

For the description of the remainder of the process of the invention, reference is made to the image of FIG. 2. Data channel 100 is a bus which carries image data, conveniently in terms of rgb color density signals. Enhancement channel 102 carries data from data channel 100 to subsampler 104, which as described, optionally undersamples the data and delivers it to information generation and distribution 106 which accomplished the common functions required for all the enhancement modules, and which may conveniently be derived at the same time. Accordingly, information generation and distribution 106 accomplishes conversion of the image from RGB space to luminance space, derives a histogram of the luminance signal for the image, generates local histograms required for exposure correction as taught in U.S. patent application Ser. No. 08/132,973 (cited above) determines the black and white points for color balance as taught in U.S. patent application Ser. No. 08/133,231, filed Oct. 7, 1993, and determines average values for color balance as taught in U.S. patent application Ser. No. 08/131,172.

The initial color image data initially received from scanner 10 or the like, is assumed to be in RGB space initially, i.e., red-green-blue space, and for the inventive process, must initially be converted to luminance space ($YC_1C_2$) at information generation and distribution 106. It is possible that the image will already be in luminance space, as it is common to convert RGB values to luminance/chrominance space for other image processing. $YC_1C_2$ space is a useful space in which the inventive process can be performed, and Xerox YES space is one possible embodiment of such a space. Whatever space is used must have a component which relates to the human visual perception of lightness or darkness, such as Y of Xerox YES of the "Xerox Color Encoding Standard," XNSS 289005, 1989. In the following, the invention will be described using the Xerox YES color space.

From information generation and distribution 106, data is made available on information channel 108, which carries multiple signals to each correction module buses 110, 120 and 130. Correction processor buses 110, 120 and 130, respectively, forward signals required for operation to exposure processor 112, color balance processor 122 and contrast processor 132, and likewise return information to information channel 108 as required. Each of exposure processor 112, color balance processor 122 and contrast processor 132 use the data supplied via information channel 108 to calculate the signals for TRC generators 114, 124 and 134 respectively, to generate TRC's reflecting required image modification determined at each processor. Each of TRC generators 114, 124 and 134 directs generated TRC's to TRC combiner 140, which combines the generated TRC's into a single look up table and stores the results at TRC controller 150 via bus 160. TRC controller 150 applies the changes to the rgb signals on bus 100 as required. Judge or arbiter 170 operates to resolve conflicts in the TRC determination, so that processors 112, 122 and 132 do not operate at cross purposes. The output of TRC controller 150 might be directed to a sharpness adjustment stage as described in U.S. patent application Ser. No. 08/147,612, filed Nov. 1993.

It should be noted that the output of the TRC controller 150 might have a number of bits different from the original number of bits in the image. This is specially useful if the output is directed to a sharpness adjustment stage that optionally incorporates a reduction in the number of bits, say from 10 bits to 8 bits.

In accordance with the invention, exposure processor 112 and contrast processor 132 both operate on the luminance histogram, and preferably operate in order of exposure, first, and contrast, second. Accordingly, after directing the exposure signal to TRC generator 114, the exposure signal produced at exposure processor 110 is directed to information generation and distribution 106 via information channel 108. This signal is used to generate a modified histogram according to the determined exposure adjustment. This modified histogram is subsequently filtered with a blur or smoothing function, such as an averaging over about 10 adjacent levels, to blur or smooth peaks naturally resulting in the modified luminance histogram due to exposure adjustment. It should be noted that the operation of this filter can be modified for increased or decreased smoothing. It also appears to be desirable to modify the filter operation based on the amount of correction to the histogram at the exposure processor. The blurred modified histogram is then forwarded to contrast processor 132, via information channel 108 and correction processor bus 130.

Figure 3:
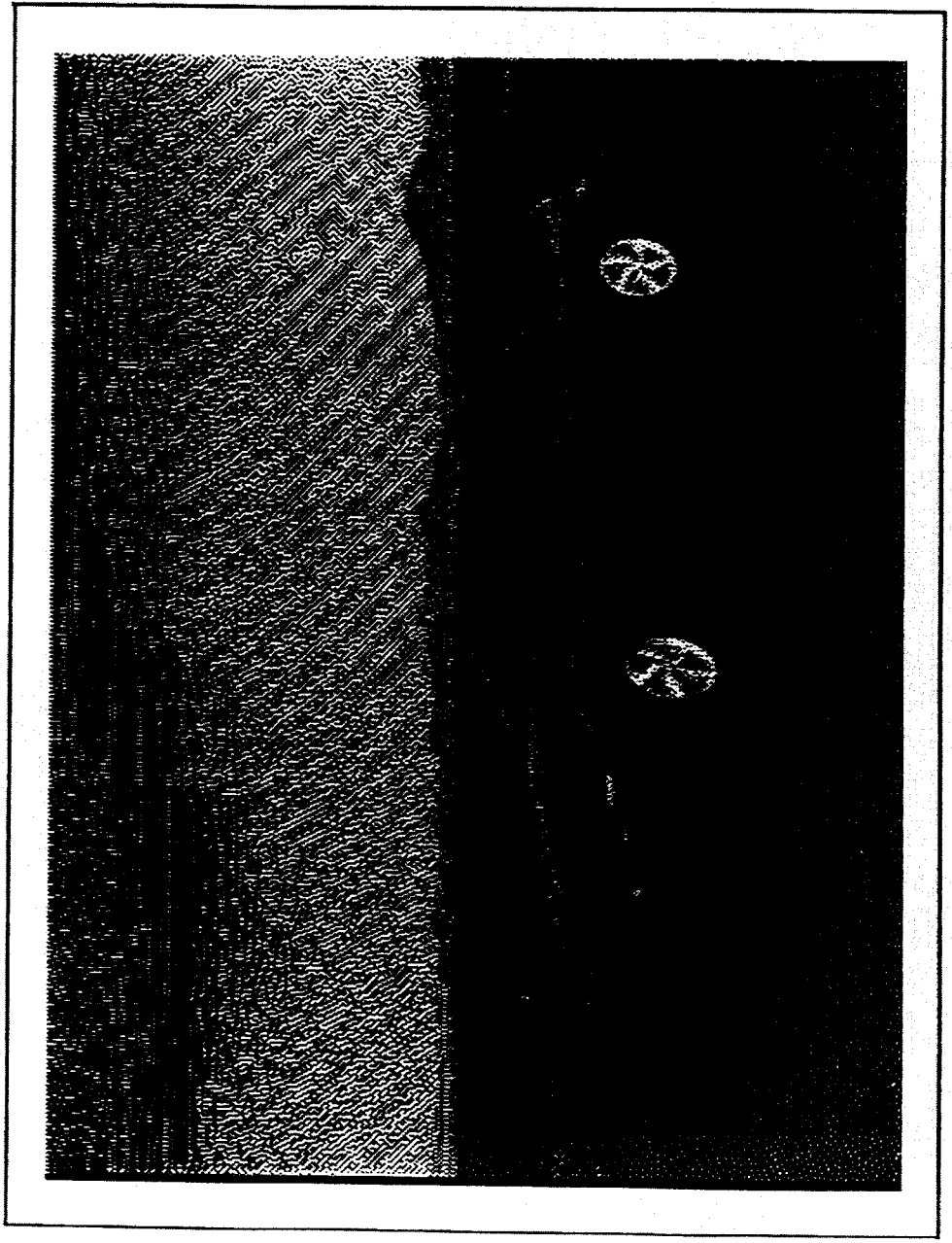
FIG. 3 shows a pseudo gray level image which will be processed in accordance with the invention.
Figure 4:
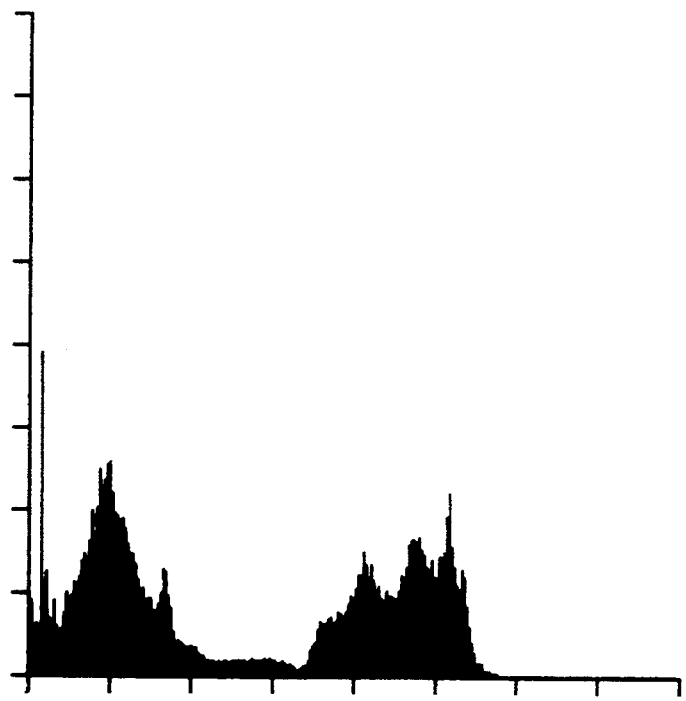
FIGS. 4, 5, 6 and 7 describe histograms after each processing step of the invention.
Figure 5:
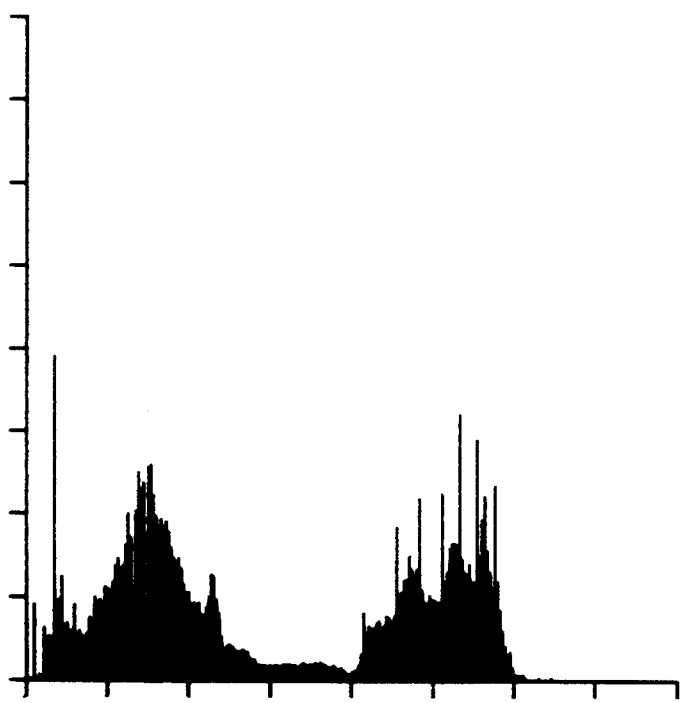
Figure 6:
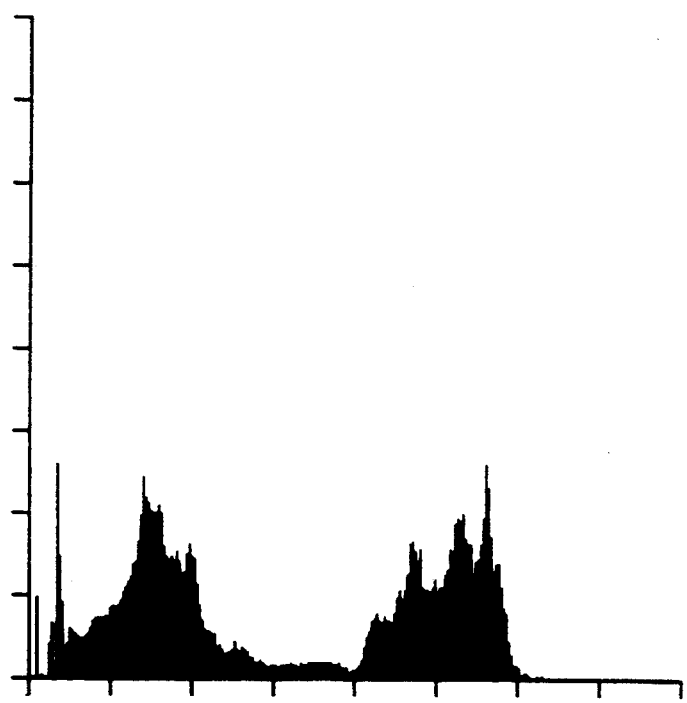
Figure 7:
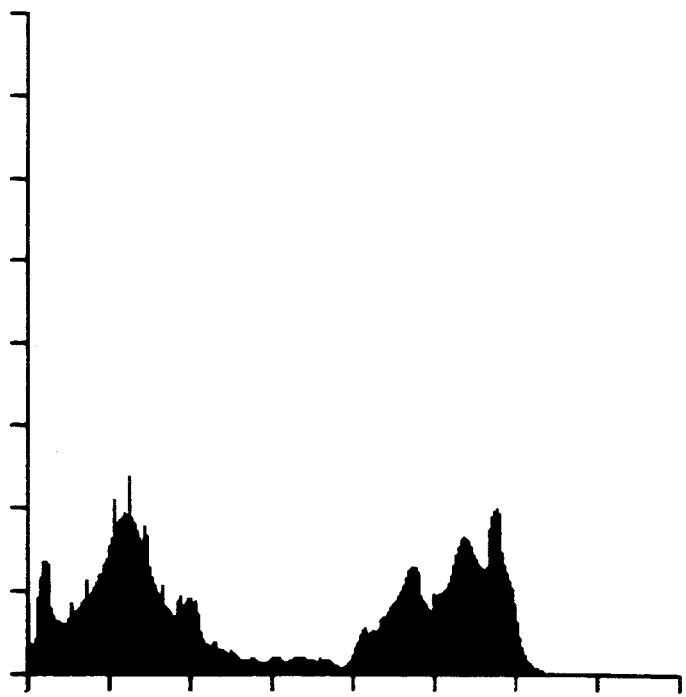

With reference now to FIGS. 3, 4, 5, 6 and 7, an illustration the inventive method, as applied to an image, is shown. FIG. 3 is a pseudo gray illustration of a color image to be illustrated. FIG. 4 is a histogram of the luminance channel of the actual color image. FIG. 5 illustrates an exposure corrected histogram which results from the process steps described in U.S. patent application Ser. No. 08/139,660, filed Oct. 22, 1993 of: a) using the FIG. 4 histogram to generate exposure correction values; b) using the exposure correction values to generate exposure correction TRC; and c) using the exposure correction TRC to modify the luminance histogram of FIG. 4. FIG. 6 illustrates the effect of applying the exposure correction to the color input image and re-measuring the luminance histogram. Note that the process used to derive FIG. 6 made use of applying the TRC to the image and to re-measure the luminance histogram after processing. This is undesirable, since multiple operations and measurements are time consuming. As can be seen by comparing FIGS. 5 and 6, strong differences exist, exemplified by the spikes and gaps dominant in FIG. 5 and missing in FIG. 6. FIG. 7 shows the histogram derived through the proposed inventive process. The histogram signal of FIG. 5 was filtered using a smoothing filter to give the histogram shown in FIG. 7. The gaps and spikes of FIG. 5 are reduced or eliminated. This filtered histogram is delivered to contrast processor 132. It might be noted that the histogram displayed in FIG. 7 is also slightly smoothed with respect to the histogram shown in FIG. 6 This is not decremental to the process, since a smoother histogram aids in the contrast enhancement step by homogenizing the contrast TRC steps.

It should be noted that the system described in FIG. 6 is one possible implementation of a cascaded image enhancement system making use of the described inventive method. An alternate approach could locate the inventive method of predicting the image histogram into the individual modules.

It should be noted that the system described in FIG. 6 may contain individual modules that do not base their operation on the luminance histogram.

It will no doubt be appreciated that the present invention may be accomplished with either software, hardware or combination software hardware implementations.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method of cascade processing a natural scene image recorded as a set of electronic signals, at n image processing modules each requiring histogram data, including the steps of:
   receiving a set of color image-describing electronic signals from a source of natural scene images;
   deriving from the received color image describing signals a signal representing overall intensity of the image;
   from the intensity signal, generating a histogram signal, describing a population of intensity signals at each possible intensity level in the image;
   using the histogram signal at a first image processing module, and generating a first tone reproduction curve reflecting processing of the image at the first image processing module;
   operating on the histogram signal with the tone reproduction curve to produce a modified histogram signal;
   operating on the modified histogram signal with a filter, to produce a blurred or smoothed modified histogram signal;
   directing the blurred or smoothed modified histogram signal to a next image processing module;
   using the histogram signal at the next image processing module, and generating a second tone reproduction curve reflecting processing of the image at the next image processing module;
   combining each of the generated tone reproduction curves, and applying the curve to the received color image describing signals.

2. The method as defined in claim 1, wherein each original electronic signal is defined in terms of red-green-blue color space.

3. The method as defined in claim 2, wherein each original electronic signal defined in terms of red-green-blue color space is converted to luminance-chrominance space, and the signal describing intensity of the image is the luminance signal.

4. The method as defined in claim 2, including the initial step of sampling the electronic signals at a resolution less than the resolution of the electronic signals.

5. A method for cascade processing a natural scene image recorded as a set of electronic signals to alter at least exposure and contrast, comprising:
   receiving a set of color image-describing electronic signals from a source of natural scene images;
   deriving from the image a luminance signal describing image intensity;
   from the luminance signal, generating a histogram signal, describing the population of luminance signal at each possible intensity level;
   from the histogram signal at an exposure processing module, generating a first tone reproduction curve reflecting exposure processing of the image at the exposure processing module;
   operating on the histogram signal with the tone reproduction curve to produce a first modified histogram signal;
   operating on the modified histogram signal with a blur filter, to produce a blurred modified histogram signal;
   directing the blurred modified histogram signal to the exposure processing module;
   operating on the histogram signal at the contrast processing module, and generating a tone reproduction curve reflecting processing of the image at the contrast processing module;
   combining each of the generated tone reproduction curves, and applying the curve to the received color image describing signals.

6. The method as defined in claim 5, wherein each original electronic signal is defined in terms of red-green-blue color space.

7. The method as defined in claim 5, wherein each original electronic signal defined in terms of red-green-blue color space is converted to luminance-chrominance space, and the signal describing intensity of the image is the luminance signal.

8. The method as defined in claim 5, including the initial step of sampling the electronic signals at a resolution less than the resolution of the electronic signals.

9. Apparatus for cascade processing a natural scene image recorded as a set of electronic signals to alter at least exposure and contrast, comprising:
   a color density signal input, receiving color image-describing electronic color density signals from a source of natural scene images;
   a color space converter, operating on received color density signals and producing a luminance signal describing image intensity;
   a processing controller generating a histogram signal from the luminance signals, describing the population of luminance signal at each possible intensity level and directing the histogram signal to an information channel;

an exposure processing module, operatively connected to said information channel to receive said histogram signal, and generating a first tone reproduction curve reflecting exposure processing of the image at the exposure processing module, and returning tone reproduction curve information to said processing controller;

said processing controller operating on the histogram signal with the returned tone reproduction curve to produce a first modified histogram signal, operating on the first modified histogram to produce a blurred modified histogram signal and directing the histogram signal to an information channel;

a contrast processing module, operatively connected to said information channel to receive said blurred modified histogram signals, and generating a second tone reproduction curve reflecting exposure processing of the image at the contrast processing module;

a tone reproduction curve combiner, operatively connected to each processing module and combining each tone reproduction curve generated thereat, and directing the combined curves to a TRC controller, applying the curve to the received color image-describing signals electronic color density signals.

10. The apparatus as defined in claim 9, wherein each original electronic signal is defined in terms of red-green-blue color space.

11. The apparatus as defined in claim 9, including a subsampling processor sampling the electronic signals at a resolution less than the resolution of the electronic signals.

12. The apparatus as defined in claim 9, including at least one image processing module that do not use a luminance histogram to derive their processing operations, operatively interposed between the contrast processing module and the exposure processing module.

* * * * *